(12) United States Patent
Witonsky et al.

(10) Patent No.: US 6,257,759 B1
(45) Date of Patent: *Jul. 10, 2001

(54) LIQUID CRYSTAL THERMOMETER

(75) Inventors: Robert J. Witonsky, Princeton; John W. Scarantino, Mercerville, both of NJ (US)

(73) Assignee: Medical Indicators, Inc., Carlsbad, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/344,752

(22) Filed: Jun. 25, 1999

Related U.S. Application Data

(60) Provisional application No. 60/090,809, filed on Jun. 26, 1998.

(51) Int. Cl.⁷ .................................................. G01K 11/12
(52) U.S. Cl. .......................... 374/162; 374/150; 374/160; 116/207
(58) Field of Search .................................... 574/158, 160, 574/162; 116/207, 216

(56) References Cited

U.S. PATENT DOCUMENTS

| 3,704,625 | * | 12/1972 | Seto et al. ........................... 374/162 |
| 3,712,141 | * | 1/1973 | Chadha et al. ....................... 116/207 |
| 3,974,317 | * | 8/1976 | Sharpless ............................. 116/207 |
| 4,064,872 | * | 12/1977 | Caplan ................................. 116/207 |
| 4,362,645 | * | 12/1982 | Hof et al. ............................. 116/207 |
| 4,433,637 | * | 2/1984 | Buirley et al. ....................... 116/207 |
| 4,846,095 | * | 7/1989 | Emslander .......................... 116/207 |
| 5,401,100 | * | 3/1995 | Thackson et al. ................... 374/160 |
| 5,676,465 | * | 10/1997 | Witonsky et al. ................... 116/207 |

* cited by examiner

Primary Examiner—Diego Gutierrez
Assistant Examiner—Jeanne-Marguerite Goodwin
(74) Attorney, Agent, or Firm—Foley & Lardner; Bernard L. Kleinke

(57) ABSTRACT

A self-updating temperature thermometer is disclosed that is capable of generating a real-time signal of core body temperature. The thermometer comprises a double-sided flexible substrate, having a first side and a second side. The first side has a plurality of cavities, and a liquid crystal composition in these cavities to define a plurality of sensor dots. A cover layer is disposed on the first side, and a pressure-sensitive adhesive is disposed on the second side of the substrate. The sensor surface area to substrate thickness is maximized using the structural features of this invention, thereby providing a thermometer exhibiting unexpectedly good results in that it is capable of generating a continuous temperature measurement that is automatically updated with changes in body temperature.

36 Claims, 5 Drawing Sheets

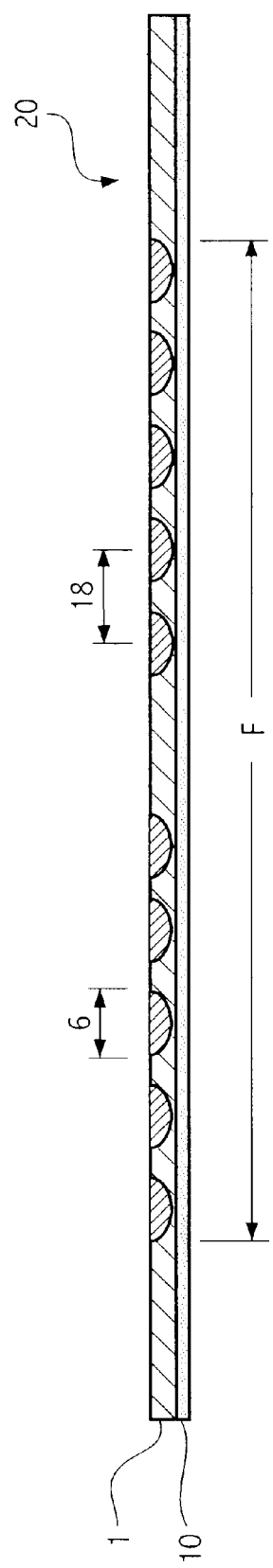

LIQUID CRYSTAL THERMOMETER

RELATED APPLICATIONS

Applicant claims a right of priority based on U.S. provisional application Serial No. 60/090,809, filed Jun. 26, 1998.

FIELD OF THE INVENTION

This invention relates to the field of clinical thermometers. In particular, it relates to a self-updating liquid crystal clinical thermometer.

BACKGROUND OF THE INVENTION

The thermochromic property of cholesteric liquid crystal compounds has invited considerable effort for their application to thermometer inventions. Many of the liquid crystal thermometers described in the prior art are designed to be used for measuring human body temperature; however, the medical community has demanding needs which have inhibited the commercial success of these thermometers in clinical applications. A medically-acceptable clinical thermometer based on liquid crystal color changes would need to meet the same exacting standards for range (35–41° C.), resolution (0.1° C.), accuracy (0.1° C. in the critical range, 0.2° C. elsewhere), and stability as do mercury-in-glass and electronic clinical thermometers. Furthermore, the thermometers should be designed to (i) measure the temperature at a site which is accepted in the medical community as faithfully representing core body temperature (e.g., rectum, sublingual cavity, or axilla), (ii) be easy to read, clean, and reset between uses, (iii) be safe and comfortable when used at the site, and (iv) retain their accuracy for at least five years during storage and distribution when subjected to temperature extremes of −20 to 60° C. It also is naturally preferred for a thermometer to exhibit competitive advantages such as being less expensive, easier to use, harder to break, more child friendly and require less (preferably no) power than competing products.

Challenges have been encountered in developing thermometers meeting these standards. The liquid crystal forehead thermometer is a good example. Because of its low resolution (±1° C.), it has principally served as a screening device for fever, requiring subsequent confirmation of true body temperature with a mercury-in-glass or electronic clinical thermometer. This is not, however, its only drawback The forehead is an unreliable site for representing core temperature, failing more than 50% of the time to detect fever (false negatives).

Over the years, various compositions and structures have been developed in seeking to improve the performance of liquid crystal thermometers. See, e.g., U.S. Pat. No. 3,974, 317, *"Thermometric Compositions Including Inert Additives and Products,"* issued Aug. 10, 1976 to Sharpless (the '317 patent), incorporated herein by reference. The '317 patent describes a liquid crystal system comprising (a) 57.9% cholesteryl oleyl carbonate, 30.7% cholesteryl chloride and 11.4% cholesteryl-n-butoxyphenyl carbonate, and (b) mineral oil. With this composition, temperature differences as small as 0.1° C. can be easily resolved, thus making the composition well-suited for use in clinical thermometers.

This chemistry is itself insufficient, however, for making a clinical thermometer. Constraints are also placed on the heat-sealable substrate and transparent covering film that contain the liquid crystal compositions. See, e.g., U.S. Pat. No. 4,064,872, *"Temperature Measuring Device of a Liquid Crystal Laminate,"* issued Dec. 27, 1977 to Caplan (the '872 patent), incorporated herein by reference. Here it is taught that for the preparation of thermometers useful for medical diagnosis, the separate films comprising the heat-sealable sheet material and the carrier substrate should contain less than 1 mg per square meter of components which will react with the liquid crystals, either during manufacture or storage. The '872 patent teaches use of polyvinyl chloride (PVC) and polyvinylidene chloride (PVDC) coated laminates as the heat-sealing material. This patent emphasizes that the materials selected to enclose the liquid crystal compositions should have a thermal mass that is as low as possible consistent with sufficient durability to allow for repeated use. The '872 patent additionally describes a method for constructing a clinical thermometer from these compositions by arranging them in a dot matrix array.

Thermometers made using the teachings of the '317 and the '872 patents suffer from serious technical shortcomings, however. One such shortcoming relates to readability. The small size of the individual dots (1 mm diameter) and the low contrast between the green liquid state and the gray focal conic state make it difficult to read the thermometer, particularly for those who are unfamiliar with reading the thermometer or who attempt to read it in lighting of low intensity. Because of this deficiency, clinical thermometers made using these teachings have experienced limited commercial success.

Another shortcoming of liquid crystal thermometers relates to the relatively short duration of the signal (15–20 seconds, before reversion begins). When liquid crystal thermometers are removed from one environment in their range of transition to a lower temperature, the signal fades so rapidly that it is difficult to obtain an accurate temperature measurement of the first environment. There are two reasons for this. First, like all thermometers, those made of liquid crystals are of low thermal mass and cool quickly. Second, nearly all liquid crystal compositions respond with time constants of less than one second and thus display exceedingly short memory.

A thermometer structure has been achieved that addresses problems relating to the retention of the signal. See U.S. Pat. No. 5,676,465, *"Liquid Crystal Clinical Thermometer,"* issued Oct. 14, 1997 to Witonsky and Scarantino (the same inventors herein), assigned to the present assignee, which is incorporated herein by reference (hereinafter the '465 patent). The '465 patent discloses a thermometer containing the liquid crystal composition in a pocket or cavity having a domed, inverted structure and an air void comprising about 5 to about 50% of the volume of the cavity. With that structure, a thermometer is provided that retains a signal indefinitely, while at the same time being fully reversible by the application of pressure to the region of the thermometer containing the liquid crystal. The inverted dome structure of the '465 patent also enhances the contrast between the two states, liquid crystal and focal conic, useful for temperature measurement. The inversion of the thermometer pocket may be accomplished by subjecting a thermometer of conventional structure to elevated temperatures.

With the thermometer of the '465 patent, once a reading is taken, the medical practitioner must discard the thermometer, mechanically erase the signal on the thermometer by rubbing his or her finger over the sensor dots, or wait for a period of about one minute. This will induce a change in those clear sensors (black background) with transition temperatures below the temperature of the patient's skin and return them to the colored liquid crystal state. This design has drawbacks in that the nurse or clinical attendant may not continuously monitor temperature during the course of a day. When the thermometer is placed and left on the patient, the temperature information obtained at a later time may not faithfully represent the real-time temperature of the patient, because the thermometer is "peak reading." The temperature information obtained at the time of recording could be several hours old. Consequently, the appropriate intervention action will not be known unless the cleared thermometer is allowed to thermally equilibrate, a process that can require additional minutes of waiting.

As may be appreciated, those involved in the field of thermometry for clinical use continue to seek to develop new thermometer designs that meet the challenging standards posed by the medical community. In particular, it would be advantageous to have a liquid crystal thermometer which is flexible and may be comfortably used on body surfaces that accurately reflect core body temperature. It also would be advantageous to have a liquid crystal thermometer that is capable of continuously providing an accurate measurement of body temperature, without the need for erasing a pre-existing signal. These and other advantages are provided by the instant invention.

BRIEF DESCRIPTION OF THE DRAWINGS

For a better understanding of the invention, an exemplary embodiment is described below, considered together with the accompanying drawings, in which:

FIG. 2 shows a cross-sectional side view of the inventive thermometer taken along the line A—A of FIG. 3A;

It is to be understood that these drawings are for the purposes of illustrating the concepts of the invention and are not to scale.

SUMMARY OF INVENTION

Summarily described, the invention embraces a liquid crystal thermometer that is flexible and capable of self-updating. Applicants have discovered a thermometer structure that negates the requirement for clearing the signal before obtaining a real-time temperature. It surprisingly has been found that by maximizing the ratio of the sensor surface area to substrate thickness using the structural features of this invention, a thermometer is provided exhibiting unexpectedly good results. This thermometer provides a continuous temperature measurement and automatically updates, in real-time, the temperature signal being emitted. Being flexible, the thermometer may be applied to body areas having a fixed relationship to the core body temperature, preferably the axilla. In one embodiment, the thermometer has a sensor dot with a diameter of about 1.2 to 1.3 mm and a depth of about 0.17 to 0.18 mm. The sensor dot is placed in a relatively thin substrate, i.e., having a thickness of about 0.25 mm. The invention also relates to methods for continuously measuring the body temperature of a patient by applying the thermometer to a body area which has a fixed relationship to the core temperature of the patient (such as the armpit).

DETAILED DESCRIPTION OF THE INVENTION

This invention relates to a self-updating liquid crystal thermometer adapted for clinical use that is capable of generating a real-time signal of core body temperature. The thermometer comprises a double-sided flexible substrate, having a first side and a second side. The first side has a plurality of cavities with a liquid crystal composition disposed therein to define a plurality of sensor dots. A cover layer is disposed on the first side, and a pressure-sensitive adhesive is disposed on the second side of the substrate. The sensor dot surface area to substrate thickness is maximized, e.g., the sensor dot preferably has a diameter that is about five times the thickness of the substrate. With these structural features, a thermometer exhibiting unexpectedly good results is provided in that it is capable of generating a continuous and automatically self-updating signal of the temperature measurement.

Figure 1A:
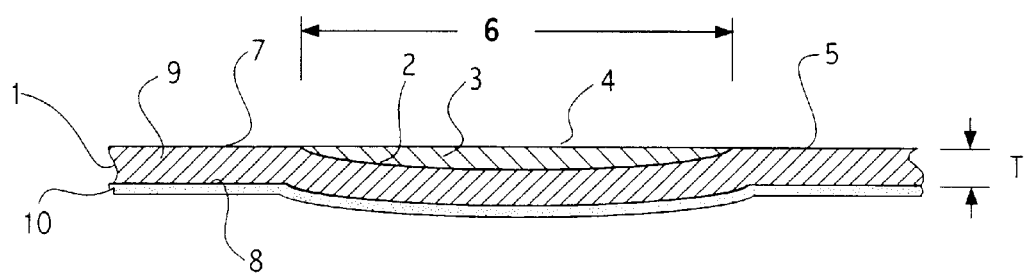
FIG. 1A shows a cut-away cross-sectional view of a portion of the inventive thermometer including a sensor dot, e.g., the cavity filled with the liquid crystal composition.

Referring to FIG. 1A, there is shown a cut-away cross-sectional view of a portion of the inventive thermometer including a sensor dot, e.g., the cavity filled with the liquid crystal composition. The thermometer will include a plurality of these dots, preferably arranged in a matrix, as shown in FIGS. 3A–4B. A carrier layer or flexible substrate 1 has a first side 7 and a second side 8. The substrate is embossed to form a depression or cavity 2 into which is deposited the liquid crystal composition 3. The embossed cavity or depression 2 is then sealed with a transparent cover layer 4 which is heat sealed to the substrate 1 on an unembossed land area 5, i.e., an area of the substrate not containing a cavity. Preferably, the composition when placed in the cavity occupies between about 50% to about 90% of the volume of the cavity. The composition is shown occupying 100% of the cavity in FIG. 1A, as helium has been injected into the cavity to displace air therein, with the helium then permeating the cover layer (as further described below). The printing shown in FIGS. 3A, 3B, 4A and 4B (and described further below) may be done on the underside 8 of the substrate 1. Additionally, an overlayer of black pigment (not shown), may be applied to the underside of the substrate 1 in the thermometer field area (see FIGS. 2, 3A–4B) to make the color of the liquid crystal composition more visible. This reverse printing prevents the potential adverse reaction of the liquid crystals with the ink.

Unlike in previous thermometers, with this thermometer a layer of pressure-sensitive adhesive 10 is applied directly to the underside 8 of the carrier layer. Suitable pressure-sensitive adhesives for this application should be comfortable when applied to human skin, have adequate tack to skin, be hypoallergenic, contain no natural latex, and be designed to maintain contact with human skin for sustained periods. Adhesives exhibiting these properties include 3M's 9879 and 1522, Avery Dennison's MED 6000, and Flexcon's DermaFLEX TT200 H-575 84 D/F PFT. The adhesive layer 10 advantageously is applied after the other parts of the thermometer are manufactured, e.g., in a post-manufacturing step.

Figure 1B:
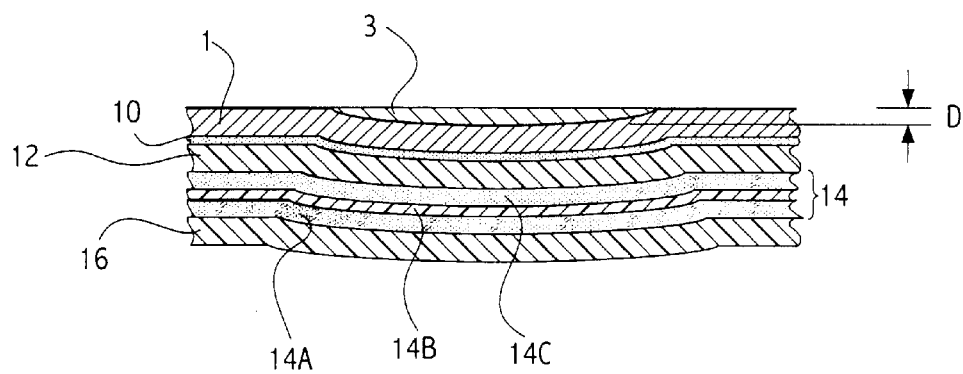
FIG. 1B shows a cross-sectional view of the sensor dot of FIG. 1A with post-manufacturing adhesives and medical tape applied to the underside of the thermometer.

An advantage of this invention is that there is improved adhesion between the thermometer and the skin of the human whose temperature is being measured. This is due to a variety of factors, including the adhesives used, the larger surface area of the thermometer as compared with previous devices, and the thinner structure (which makes the thermometer less likely to peel off the skin). FIG. 1B shows a cross-sectional side view of the sensor of FIG. 1A with post-manufacturing adhesives and medical tape applied to the underside of the thermometer. Following the adhesive layer 10, there may be applied a white polypropylene (PP) film 12, preferably of about 0.10 mm. Medical tape 14 then may be applied to the PP film 12. The medical tape 14 may comprise a 3M medical tape having a first layer of adhesive 14a (~0.04 mm in thickness), a carrier layer 14b (~0.08 mm in thickness), and a second layer of adhesive 14c (~0.04 mm in thickness). The thermometer with the medical tape thereon may be placed on a medical tape release liner 16 (~0.11 mm in thickness); the liner 16 may comprise a sheet onto which a plurality of thermometers are adhered. The nurse or other clinical attendant then could remove a thermometer from the liner 16 and apply the first adhesive layer 14a to the patient's skin.

The base or carrier layer 1 should satisfy a constellation of properties to function in this type of thermometer. The plastic film or laminate comprising the carrier layer 1 should be clear so that the back side can be printed black; it should be embossible without cracking to a depth of about 0.2 mm; it should be inert with respect to the liquid crystals and contain no residual low molecular substances from its processing that could migrate into and contaminate As the liquid crystals; and it should be heat-sealable to other thin transparent inert plastic films. A preferred material which satisfies these criteria is Eastar® PETG copolyester 6763 which is a clear amorphous polymer of polyethyleneglycol terphthalate ("PETG") with a glass transition temperature of 81° C. Eastar® is a registered trademark of the Eastman Kodak company.

The upper cover layer 4 should also be inert with respect to the liquid crystals, transparent, heat sealable to the PETG, and contain no low molecular weight components which can migrate into the liquid crystal composition during processing or subsequent storage. There are several materials that satisfy these criteria including laminates of PETG 6763, polyvinylidene chloride ("PVDC") coated polyesters (such as DuPont's M44 film where the PVDC coating is applied from an aqueous emulsion), and polyester films coated with amorphous polyester. Because phthalate polyesters do not readily heat seal to themselves, generally, the cover layer is coated with a polymer which permits heat sealing to these polyesters. Preferably the heat sealable component, e.g., PVDC, is deposited from a water emulsion.

Figure 3A:
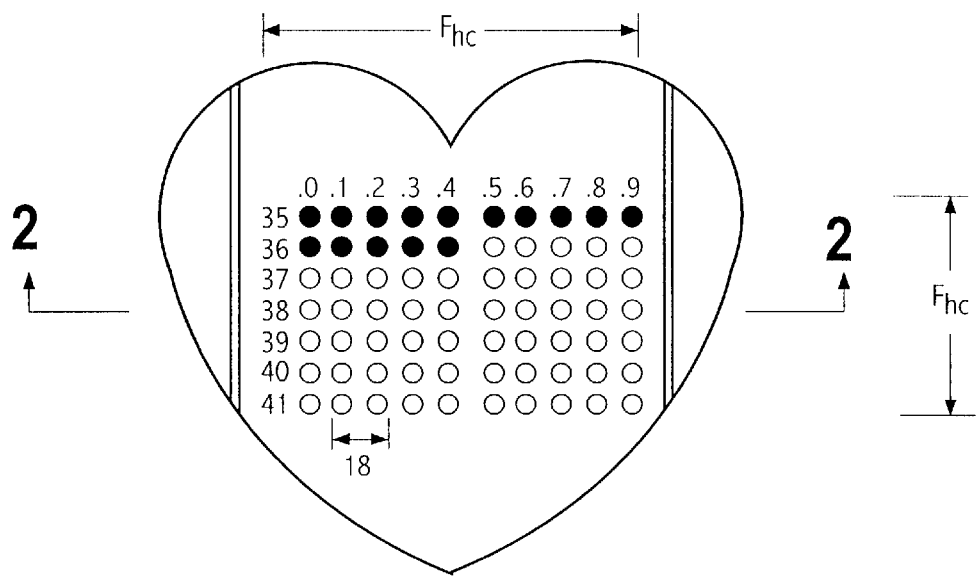
FIGS. 3A–3B show top plan views of the inventive thermometer with temperature scales imprinted thereon in degrees Celsius (FIG. 3A) and Fahrenheit (FIG. 3B)
Figure 3B:
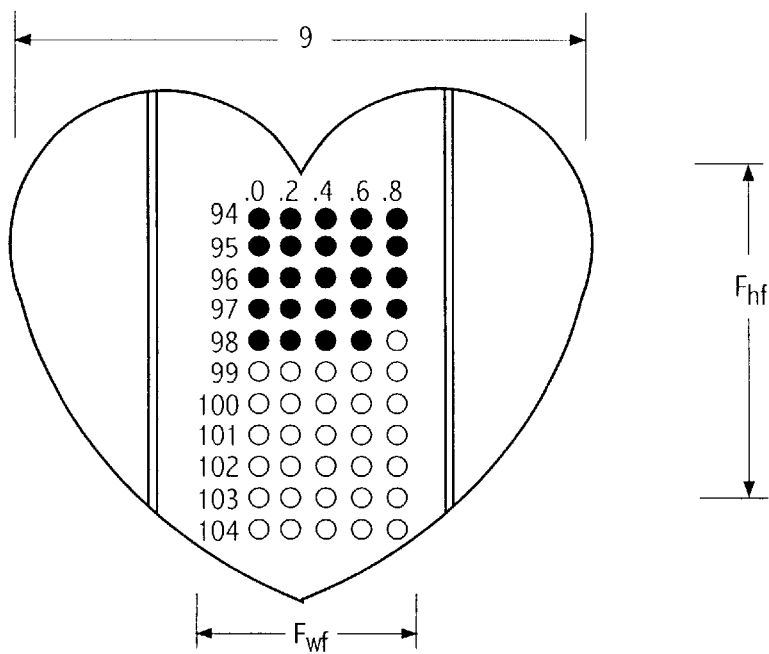
Figure 4A:
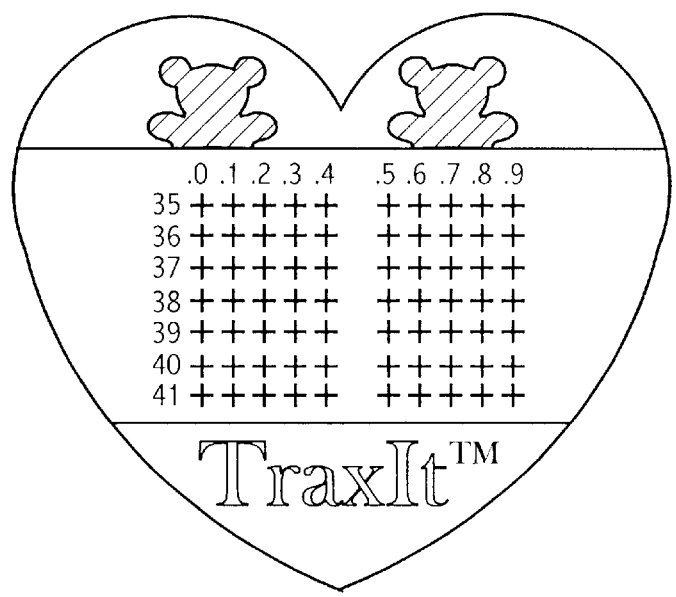
FIGS. 4A–4B show alternative top plan views of the inventive thermometer with temperature scales and other matter imprinted thereon in degrees Celsius (FIG. 4A) and Fahrenheit (FIG. 4B)
Figure 4B:
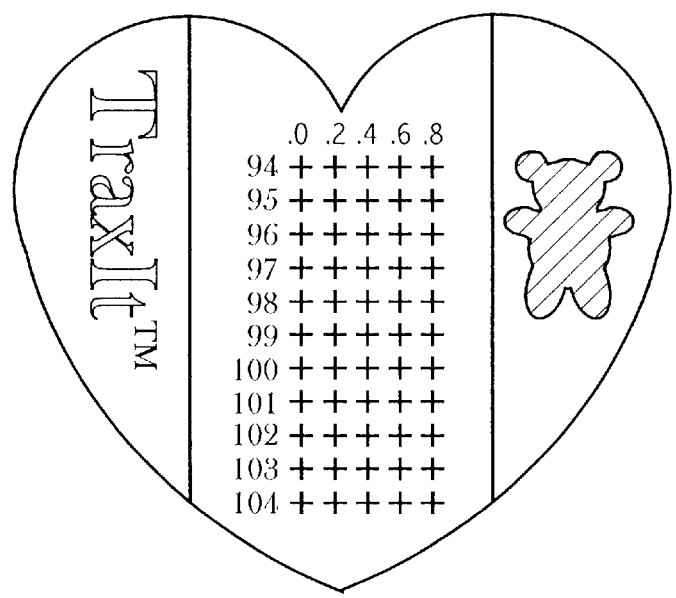

Referring now to FIG. 2, there is shown a cross-sectional side view of the inventive thermometer, taken along the line 2—2 of FIG. 3A. FIGS. 3A and 3B show top plan views of two embodiments of the thermometer, with FIG. 3A showing a temperature scale in degrees Celsius, and FIG. 3B showing a temperature scale in degrees Fahrenheit. FIGS. 4A and 4B show alternative top plan views of two embodiments of the thermometer, with FIG. 4A showing a temperature scale in degrees Celsius, and FIG. 4B showing a temperature scale in degrees Fahrenheit. In FIGS. 4A and 4B, the sensor cavities are represented by crossed lines, although generally they will be substantially circular or cylindrical in shape.

With this inventive thermometer, it has been surprisingly found that by maximizing the ratio of the surface area of the sensor to the thickness of the substrate, a self-updating thermometer is provided. An increased surface area of the sensor and a decreased thickness of the substrate function to amplify the mechanical disturbances and cause a rapid reversal of the metastable sensors. With the combination of structural features described herein, the performance of the thermometer is changed so that it is capable of accurately tracking and systematically updating the surface temperature (as opposed to being peak reading). The overall structure of the thermometer is less rigid than previous thermometers and is thinner with a larger surface area. The individual sensors of this thermometer are more sensitive to small mechanical perturbations than sensors of previous thermometers. For example, when the inventive thermometer is placed in the axilla, a slight movement of the body will stimulate those sensors that have previously changed color but have higher transition temperatures than the body surface to spontaneously return to their liquid crystal state. When the arm is raised to read the thermometer, the exposure to the cooler air does not alter the reading. This results in continual and automatic updating of the temperature reading of the thermometer. The accuracy of these thermometers is about ±0.2° F. or about ±0.1° C.

The preferred dimensions of the inventive thermometer will now be described with reference to FIGS. 1, 2, 3A–3B, and 4A–4B. The diameter of the cavities 6 (FIGS. 1A and 2) is preferably about 1.25 to 1.3 mm. This is an increase from previous thermometers which have used cavities with a diameter of about 0.75 mm. The depth of the well D (FIG. 1B) is preferably about 0.17 to 0.18 mm, which also is an increase from previous thermometers which have used a well depth of about 0.10 mm. The thickness of the substrate T (FIG. 1A) is about 0.25 mm, contrary to previous thermometers which have used a thickness of about 0.31 mm. Thus, the diameter of the cavity (1.25 mm) preferably is about five times or more the thickness of the substrate (0.25 mm); or in other words, the substrate thickness is about twenty-percent or less the diameter of the cavity. The thickness of the substrate is about 1.4 to 1.5 times the depth of the cavity; or in other words, the depth of the cavity is about 70% of the substrate thickness). Typically, the thermometer has a width 9 (FIG. 3B) of about 32 mm or about 1.25 to 1.275 inches.

The size of the field F (FIG. 2) (where the sensor dots are located), and the number of sensor dots may depend upon whether a Celsius or Fahrenheit scale is used. Generally, the field F may be about 14 to 15 mm long, with the rows and columns of cavities spaced apart a center-to-center distance 18 of about 1.7 to 1.8 mm (FIG. 2, FIG. 3A). More particularly, when the Celsius scale is used (FIG. 3A), the field width ($F_{wc}$ is about 22 mm, and the field height ($F_{hc}$) is about 8 mm. When the Fahrenheit scale is used (FIG. 3B), the field width ($F_{wf}$) is about 12 mm, and the field height ($F_{hf}$) is about 24 mm. The Celsius scale (FIGS. 3A and 4A) may range from 35.0 to 41.9 degrees Celsius. The Fahrenheit scale (FIGS. 3B and 4B) may range from 94 to 104.8 degrees Fahrenheit. The scale at either extreme can be extended for unusual conditions such as hypothermia by including additional sensors with appropriate liquid crystal compositions.

Each row of cavities represents a degree change in temperature. Along the top of the columns of cavities are numbers, showing a 0.1 degree change from column to column. Thus, FIG. 3A shows a temperature reading of 36.4 degrees Celsius and FIG. 3B shows a temperature reading of 98.6 degrees Fahrenheit The printed text may be about 1.14 mm in height for convenience of readability. As can be seen, there are 55 sensor dots on the Fahrenheit thermometer and 70 sensor dots on the Celsius thermometer. Also, as can be seen in FIGS. 4A and 4B, the thermometer may be configured in an aesthetically-pleasing shape, such as a heart with child-friendly emblems or designs placed thereon. It has been found that these designs are helpful, particularly when the temperature of a small child is being taken, as they reduce the child's resistance to applying the thermometer to the skin.

The structure of this thermometer provides many advantages. As discussed above, it enables a real-time measurement of core body temperature. Additionally, there is an improved adhesion of the thermometer to the skin. The thermometer is easier to read than previous thermometers, as the sensor dots are larger in surface area and a reading may be obtained without having to remove the thermometer from the patient's skin. For example, the nurse or other clinical attendant can place the thermometer on a patient's skin early in the day and then monitor the temperature continuously throughout the day, obtaining real-time measurements, without having to reset the thermometer or remove it from the patient. The thinner structure makes the thermometer more comfortable when applied to the body and less likely to peel off. The thermometers may be applied to the patient and left in place for more than several and up to 48 hours. There is less disruption to the patient in taking the temperature. There is a shorter response time due to the increased surface area of the sensor dots and the thinner substrate.

The liquid crystal compositions described in the '317 patent may be used as the composition 3 to fill the sensor cavities 2 (FIG. 1A). Additionally, it has been found that it is advantageous in increasing the stability of the liquid crystal composition to use an anti-oxidant additive therein, preferably a small amount (~500 ppm) of 2,6-Bis(1,1-dimethylethyl)-4-methylphenol (BHT).

Where the terms first and second colors are used in connection with liquid crystal systems, it will be appreciated by those skilled in the art that what is meant is the perceived color. Below their transition temperature, or clearing point, the liquid crystals themselves are iridescent, but appear green on a black background. Above the clearing point, the liquid crystals are somewhat translucent and appear grey on a black background. It is within the scope this invention to utilize liquid crystal systems which incorporate dyes or other substances to alter the color response of the system.

The thermometer of this invention can be used repeatedly. In a hospital environment, it may be of greater acceptability as a single use disposable, e.g., it may be applied to one patient to provide a continuous measurement of body temperature, and then disposed of without being re-used on another patient In one embodiment, to insure sterility, the thermometer can be sealed in a peal pouch.

A preferred embodiment of this invention is described below.

The preferred substrate is KODAR® PETG copolyester of 0.13 mm thickness. This material is printed black on one side. The black background absorbs the components of light not reflected by the liquid crystals. The printed laminate is embossed with about 55 or 70 cylindrical shaped cavities, depending upon whether a Celsius or Fahrenheit scale is desired. Each cavity has a 1.25 mm diameter and 0.18 mm depth. Next, approximately 30 to 50 micrograms of 55 or 70 different compositions (depending on the number of cavities) of liquid crystal following the teaching of '317 are deposited into each one of these cavities. Following the fill step, a covering film of DuPont's M44, PVDC coated polyester, 0.013 mm in thickness, is heat sealed to the PETG across the land area between the embossed regions encapsulating the liquid crystal sensors. Individual thermometers with shapes like those shown in FIGS. 3A–4B may be cut from a roll using a steel die set.

The fill step may be carried out with any suitable microdeposition equipment. U.S. Pat. No. 3,810,779, incorporated herein, discloses a suitable fill system. This fill system operates on gravity feed. In view of the high viscosity of the liquid crystal chemicals, a modification of the '779 system which applies a pressure to the chemical storage reservoirs is preferred. A pressure of 1 to 3 PSI (about 50 to 150 Torr) is adequate. The more accurately pressure is controlled, the less effected is the deposition process by level of the chemical in the storage reservoir. In one embodiment, the reservoirs comprise hypodermic syringes from which the plungers have been removed and to which an air source at controlled pressure is applied. It will be appreciated by those skilled in the art that a pressure regulator of good quality, e.g., sensitivity of +5 Torr, and a drift of less than 5 Torr, should be utilized to maintain the pressure applied to the syringe bodies within a predetermined pressure range. Where the chemical is a liquid crystal composition, heating is neither required nor preferred, since prolonged exposure to elevated temperatures will degrade the chemicals.

When used as a clinical thermometer to measure temperatures orally or axillary, the liquid crystal compositions of the '317 patent may be subjected to temperatures of about 35 to about 41° C. When removed from the site of the heat source, the thermometer usually will be brought into an ambient temperature of about 20° C. This thermal shock is enhanced by evaporative cooling increasing the temperature difference by as much as 5° C. Under those circumstances there is a rapid reversion from the focal conic state to the liquid crystal state which takes place in about 20 seconds.

This phenomenon can be utilized to continuously monitor body temperature. Taking 37° as the "normal" body temperature, there is rarely a 4° C. swing in body temperature even where fever is involved. When the thermometer of this invention is applied to an appropriate body site for measuring temperature, it will read the real-time body temperature and self adjust based on changes in body temperature. Unlike previous thermometers based on the '317 patent, it does not require manual adjustment, e.g., by application of pressure, to revert from a peak temperature to the real-time temperature of the heat source.

The thermometer can be used in the axillary position. It is most advantageously used on children by applying it to the axilla, although it also may be applied to the abdomen of new born infants over the liver or other body areas considered to approximate core temperature. A nurse attending the patient can place the thermometer on the patient and then read the temperature signal at any time, with the thermometer in situ, to obtain an accurate measurement of core body temperature. The thermometer does not have to be removed from the patient and a previous signal does not have to be erased to obtain an accurate measurement.

In general the procedure for preparing a thermometer is as follows: A prepared web comprising PETG having the thermometer scale printed on the underside, and overlayed with a protective polypropylene film is fed into an embossing station of a thermometer production line. After embossing the web moves to a fill station where liquid crystal composition is deposited into the embossed cavities. Thereafter, the web is fed into a heat sealing roller nip where it is merged with a cover layer which is heat sealed to the web. The thermometer web leaves the nip with the cover layer adhered to the web in the area of the field, thereby sealing the liquid crystal composition in the cavities. The sealed thermometer structure is then cooled and subsequently die cut to the desired shape. For a line speed of about 6 cm/sec, the heated roller surface temperature is about 134° C. to effectuate an adequate seal.

Although helium is lighter than air it has surprisingly been found that helium can be introduced into a thermometer cavity by directing a stream of helium into the nip of rollers utilized to heat seal the cover layer to the substrate. The conventional method of sealing the cover layer to the substrate is to pass the embossed substrate with its chemical filled cavities and the cover layer into the nip of a pair of rollers, one of which is heated.

Figure 5:
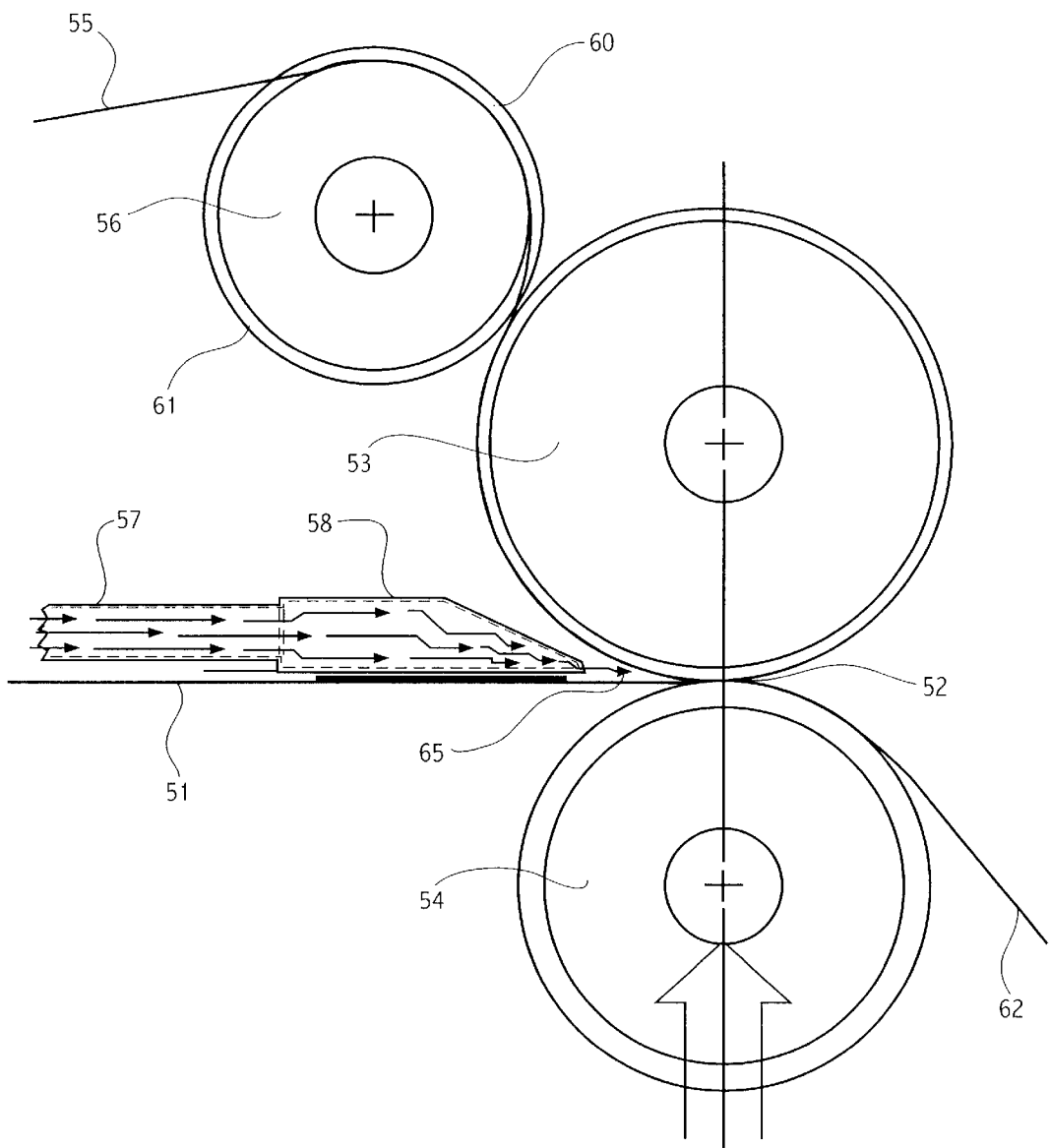
FIG. 5 shows a cross-sectional view of a portion of a sealing station.

Referring now to FIG. 5, an embossed web 51 containing cavities (not shown), to which liquid crystal compositions (not shown), have been added is passed through the nip 52 formed by heated roller 53 and a pressure roller 54. The thermometers are aligned on the web so that their longer dimension is parallel to the axis of rotation of the rollers. The cover layer 55 which is a laminate of polyester and PVDC passes over a guide roller 56 around a section of the heated roller 53 and into the nip 52. The web 51, comprising PETG, is sealed to the cover layer 55 by melting of the PVDC layer of the cover layer 55. The cover layer 55 enters the nip 52 with the PVDC side of the cover layer laminate 55 in juxtaposition with the PETG layer of the web 51. Since the heat sealing temperature is about 134° C. the polyester layer of the cover layer laminate is not melted by the heated roller 53. The sealed web 62 then passes through cooling rollers (not shown), which cool the thermometers prior to winding into a roll for transfer to a die punching station (not shown), for adhesive transfer and punching out the individual thermometers from the web. The cooling rollers are driven and pull the web 51 and cover layer 55 through the nip 52. The pressure applied by the pressure roller should not be so great as to crush the cavity. Generally an air pressure of about 40 pounds applied to pistons used to urge the pressure roller against the heater roller is adequate.

Where helium is to be introduced into the cavities a stream of helium 65 from a helium line source 57 is fed into a nozzle 58 which directs the helium stream 65 directly into the nip 52 of the rollers. In the process of doing so the helium flushes the air out of the cavity (not shown), and fills the cavity. Diffusion of the helium out of the cavity takes place over about twenty to thirty minutes. Thus, although the cavities are originally filled to about 50–90% capacity, after the helium treatment there will be no air pockets remaining therein (see FIG. 1A). The individual thermometers are die punched.

It is understood that the embodiments described herein are merely exemplary and that a person skilled in the art may make variations and modifications without departing from the spirit and scope of the invention. All such variations and modifications are intended to be included within the scope of the appended claims.

What is claimed is:

1. A liquid crystal thermometer adapted for clinical applications in continuously measuring the body temperature of a patient, the thermometer comprising:

a film layer and flexible substrate laminate having a thickness, a first side, and a second side, the first side having at least one cavity formed therein;

a liquid crystal composition disposed in the at least one cavity and occupying at least about 50% of the volume of the at least one cavity, wherein the liquid crystal composition generates a first colored state at ambient temperature and a second colored state at a temperature of a site on the patient's body to be measured;

a cover layer sealed on the first side to form an enclosure containing the liquid crystal composition in the at least one cavity to define at least one sensor dot;

wherein the at least one sensor dot automatically responds continuously to changes in temperature at the site without having to reset the thermometer; and wherein the cavity diameter is about 1.20 mm and about 1.3 mm, the cavity depth is about 0.17 mm of greater, and the thickness of the film layer and flexible substrate laminate is about 0.25 mm or less, so that the continuous measurement of the core body temperature of the patient may be made and the measurement automatically updates.

2. The thermometer of claim 1, further comprising a pressure-sensitive adhesive disposed on the second side of the substrate.

3. The thermometer of claim 1, in which the at least one cavity has a diameter greater than about five times the thickness of the film layer and flexible substrate laminate.

4. The thermometer of claim 1, in which the at least one cavity has a depth which is about seventy-percent the thickness of the film layer and flexible substrate laminate.

5. The thermometer of claim 1, in which the first side of the film layer and flexible substrate laminate has a plurality of cavities disposed therein and arranged in a matrix, the liquid crystal composition is disposed in each one of the plurality of cavities, and the cover layer is dealed over each of the plurality of cavities of define a plurality of sensor dots arranged in a matrix.

6. The thermometer of claim 1, wherein the film layer is about 0.1 mm thick.

7. The thermometer of claim 1, wherein the flexible substrate is about 0.13 mm thick.

8. The thermometer of claim 1, wherein the film layer and flexible substrate laminate overlies a layer of double-sided medical tape which overlies a medical release liner.

9. A method for continuously measuring the body temperature of a patient, the method comprising;

providing the thermometer of claim 1;

applying the thermometer to a body area having a fixed relationship to the core temperature of the patient;

leaving the thermometer in place on the body area for a period of up to forty-eight hours;

monitoring the temperature of the patient by observing the response of the at least one sensor dot to changes in temperature at the body area.

10. The method of claim 9 in which the body area comprises the axilla.

11. A liquid crystal thermometer adapted for clinical applications in measuring the body temperature of a patient, the thermometer comprising:

a film layer and flexible substrate laminate having a thickness, a first side, and a second side, the first side having a plurality of cavities formed therein and arranged in a matrix;

a plurality of liquid crystal composition, with one of the plurality of liquid crystal compositions being disposed in each one of the plurality of cavities and occupying at least about 50% of the volume of each one of the plurality of cavities, wherein each one of the liquid crystal composition generates a first colored state at ambient temperature and a second colored state at a temperature to be measured;

a cover layer sealed on the first side to form an enclosure containing the plurality of liquid crystal composition in the plurality of cavities to define a plurality of sensor dot;

a pressure-sensitive adhesive disposed on the second side of the film layer and flexible substrate laminate;

wherein the substrate has a thickness that is sufficiently small that the second side of the film layer and flexible substrate laminate will adhere to an area of the patient's body representing the core body temperature and the plurality of sensor dots will automatically respond to changes in temperature in the body of the patient so that a continuous measurement of the core body temperature may be made without having to reset the thermometer; and wherein the cavity diameter is about 1.20 mm and about 1.3 mm, the cavity depth is about 0.17 mm of greater, and the thickness of the film layer and flexible substrate laminate is about 0.25 mm or less, so that the continuous measurement of the core body temperature of the patient may be made and the measurement automatically updates.

12. The thermometer of claim 11, in which the area comprises the patient's axilla and the substrate is adapted to be maintained thereon for a period of up to forty-eight hours.

13. The thermometer of claim 12, in which the film layer and flexible substrate laminate has a thickness that is about twenty-percent or less the diameter of each one of the plurality of cavities, and the depth of each one of the plurality of cavities is about seventy-percent or more the thickness of the film layer and flexible substrate laminate.

14. The thermometer of claim 13, in which (a) the film layer and flexible substrate laminate has a thickness of about 0.25 mm and (b) each one of the plurality of cavities has a depth of about 0.17 to 0.18 mm and a diameter of about 1.2 to 1.3 mm.

15. The thermometer of claim 11, in which the plurality of cavities provide temperature measurements in the range of 35.0 to 41.9 degrees Celsius with a resolution to 0.1 degrees C.

16. The thermometer of claim 11, in which the plurality of cavities provide temperature measurements in the range of 94.0 to 104.8 degrees Fahrenheit with a resolution to 0.2 degrees F.

17. The thermometer of claim 11, wherein the film layer is about 0.1 mm thick.

18. The thermometer of claim 11, wherein the film layer is about 0.1 mm thick.

19. The thermometer of claim 11, wherein the film layer and flexible substrate laminate overlies a layer of double-sided medical tape which overlies a medical release liner.

20. A method for continuously measuring the body temperature of a patient, the method comprising:

providing the thermometer of claim 11;

applying the thermometer to a body area having a fixed relationship to the core temperature of the patient;

leaving the thermometer in place on the body for a period of up to 48 hours;

monitoring the temperature of the patient by observing the response of the plurality of sensor dots to changes in temperature at the body area.

21. A liquid crystal thermometer adapted for clinical applications in continuously measuring the body temperature of a patient, the thermometer comprising:

a film layer and flexible substrate laminate having a thickness, a first side, and a second side, the first side having at least one cavity formed therein;

a liquid crystal composition disposed in the at least one cavity and occupying at least about 50% of the volume of the at least one cavity, wherein the liquid crystal composition generates a first colored state at ambient temperature and a second colored state at a temperature of a site on the patient's body to be measured;

a cover layer sealed on the first side to form an enclosure containing the liquid crystal composition in the at least one cavity to define at least one sensor dot; and wherein the cavity diameter is about five times of greater than the thickness of the film layer and flexible substrate laminate, the depth of the cavity is about 70% of grater than the thickness of the film layer and flexible substrate laminate, so that the body temperature of a patient is measured automatically and continuously without having to reset the thermometer.

22. The thermometer of claim 21, wherein the cavity diameter is greater than about five times the thickness of the film layer and flexible substrate laminate.

23. The thermometer of claim 22, wherein the cavity depth is greater than 70% the thickness of the film layer and flexible substrate laminate.

24. The thermometer of claim 21, wherein the cavity depth is greater than 70% the thickness of the film layer and flexible substrate laminate.

25. The thermometer of claim 21, wherein the film layer is about 0.1 mm thick.

26. The thermometer of claim 21, wherein the film layer is about 0.1 mm thick.

27. The thermometer of claim 21, wherein the film layer and flexible substrate laminate overlies a layer of double-sided medical tape which overlies a medical release liner.

28. A method for continuously measuring the body temperature of a patient, the method comprising:

providing the thermometer of claim 21;

applying the thermometer to a body area having a fixed relationship to the core temperature of the patient;

leaving the thermometer in place on the body for a period of up to 48 hours;

monitoring the temperature of the patient by observing the response of the at least one sensor dot to changes in temperature at the body area.

29. A liquid crystal thermometer adapted for clinical applications in continuously measuring the body temperature of a patient, the thermometer comprising:

a film layer and flexible substrate laminate having a thickness, a first side, and a second side, the first side having a plurality of cavities formed therein and arranged in a matrix;

a plurality of liquid crystal composition, with one of the plurality of liquid crystal compositions being disposed in each one of the plurality of cavities and occupying at least about 50% of the volume of each one of the plurality of cavities, wherein each one of the liquid crystal composition generates a first colored state at ambient temperature and a second colored state at a temperature to be measured;

a cover layer sealed on the first side to form an enclosure containing the plurality of liquid crystal composition in the plurality of cavities to define a plurality of sensor dot;

a pressure-sensitive adhesive disposed on the second side of the film layer and flexible substrate laminate; and wherein the cavity diameter is about five times of greater than the thickness of the film layer and flexible substrate laminate, the depth of the cavity is about 70% of grater than the thickness of the film layer and flexible substrate laminate, so that the body temperature of a patient is measured automatically and continuously without having to reset the thermometer.

30. The thermometer of claim 29, wherein the cavity diameter is greater than about five times the thickness of the film layer and flexible substrate laminate.

31. The thermometer of claim 30, wherein the cavity depth is greater than 70% the thickness of the film layer and flexible substrate laminate.

32. The thermometer of claim 29, wherein the cavity depth is greater than 70% the thickness of the film layer and flexible substrate laminate.

33. The thermometer of claim 29, wherein the film layer is about 0.1 mm thick.

34. The thermometer of claim 29, wherein the film layer is about 0.1 mm thick.

35. The thermometer of claim 29, wherein the film layer and flexible substrate laminate overlies a layer of double-sided medical tape which overlies a medical release liner.

36. A method for continuously measuring the body temperature of a patient, the method comprising:
providing the thermometer of claim 29;
applying the thermometer to a body area having a fixed relationship to the core temperature of the patient;
leaving the thermometer in place on the body for a period of up to 48 hours;
monitoring the temperature of the patient by observing the response of the plurality of sensor dots to changes in temperature at the body area.

* * * * *

UNITED STATES PATENT AND TRADEMARK OFFICE
CERTIFICATE OF CORRECTION

PATENT NO. : 6,257,759 B1
DATED : July 10, 2001
INVENTOR(S) : Robert J. Witonsky et al.

Page 1 of 1

It is certified that error appears in the above-identified patent and that said Letters Patent is hereby corrected as shown below:

<u>Column 10,</u>
Line 7, after "diameter" insert thereafter -- between --.
Line 8, delete "of" and substitute therefor -- or --.
Line 26, delete "dealed" and substitute therefor -- sealed --.

<u>Column 12,</u>
Line 9, delete "of" and substitute therefor -- or --.
Line 10, delete "grater" and substitute therefor -- greater --.
Line 65, delete "of" and substitute therefor -- or --.
Line 66, delete "grater" and substitute therefor -- greater --.

Signed and Sealed this

Twenty-fifth Day of December, 2001

Attest:

*Attesting Officer*

JAMES E. ROGAN
*Director of the United States Patent and Trademark Office*